(12) United States Patent
Du et al.

(10) Patent No.: US 8,645,234 B2
(45) Date of Patent: Feb. 4, 2014

(54) GENERAL LEDGER CHART OF ACCOUNTS COMBINATION EDITING REQUEST RESPONSE

(75) Inventors: Qing Du, Pleasanton, CA (US); Chi Ken Yeung, San Ramon, CA (US); Wansan Tam, Daly City, CA (US); Jason Aron Alonzo, Fair Oaks, CA (US)

(73) Assignee: Oracle International Corporation, Redwood Shores, CA (US)

( * ) Notice: Subject to any disclaimer, the term of this patent is extended or adjusted under 35 U.S.C. 154(b) by 794 days.

(21) Appl. No.: 12/548,667

(22) Filed: Aug. 27, 2009

(65) Prior Publication Data

US 2011/0055055 A1 Mar. 3, 2011

(51) Int. Cl.
*G07B 17/00* (2006.01)
*G07F 19/00* (2006.01)

(52) U.S. Cl.
USPC .............................................. 705/30; 705/33

(58) Field of Classification Search
USPC .................... 705/7, 30, 31, 106; 717/106, 122
See application file for complete search history.

(56) References Cited

U.S. PATENT DOCUMENTS

| | | | |
|---|---|---|---|
| 6,772,167 B1 * | 8/2004 | Snavely et al. | 1/1 |
| 2007/0162363 A1 * | 7/2007 | Chollon et al. | 705/30 |
| 2009/0328067 A1 * | 12/2009 | Srinivasan et al. | 719/316 |

* cited by examiner

*Primary Examiner* — Matthew Gart
*Assistant Examiner* — Rokib Masud
(74) *Attorney, Agent, or Firm* — Kilpatrick Townsend & Stockton LLP (57) ABSTRACT

A web-service for validating or invalidating accounts from a general ledger (GL) chart of accounts is described. Upon a request from an application for whether an account value corresponding to a department and a product is valid, the service indicates whether the combination of account value/department/product is valid for the chart of accounts. The system can be extensible markup language (XML)-based and can indicate validity down to the line level of a request.

17 Claims, 8 Drawing Sheets

GENERAL LEDGER CHART OF ACCOUNTS COMBINATION EDITING REQUEST RESPONSE

CROSS-REFERENCES TO RELATED APPLICATIONS

Not Applicable

BACKGROUND OF THE INVENTION

1. Field of the Invention

The present disclosure relates generally to the field of data processing for accounting data. Specifically presented are methods and systems for validating accounts in a general ledger chart of accounts using a web service.

2. Description of the Related Art

In accounting, a "general ledger" (GL) is one of the main financial records of a business. The general ledger includes more or less all of the accounts which are reported on the business' financial statements, such as cash, accounts payable, and expense accounts. Each ledger in the general ledger typically keeps a balance, or the running total of money, in each account for which the business wishes to track.

A "chart of accounts" is a collection of account names. Small businesses may wish to track a small number of accounts, but large businesses commonly wish to track hundreds or thousands of accounts. These accounts can correspond with different departments, organizations, or operational units within the business, as well as different product lines. Accounts can also correspond to different funds in educational or charitable institutions. With a large number of accounts tracked by very large enterprises, the chart of accounts can become unwieldy.

Large enterprises often employ complex financial systems to track accounting entries. Often times these complex financial systems are used as a master repository of the general ledger. For example, the complex financial systems, in which various accounts are viewed, added, or edited, effectively keep the chart of accounts that are valid for the enterprise. Enterprises may also employ other information technology systems that perform specialized tasks specific to the organization or perhaps the industry. In some examples, these specialized systems may need to reference the master data that is stored in an enterprise GL system. The specialized accounting systems may need to understand the values in the enterprise GL chart of accounts in order to produce valid accounting entries that will ultimately be booked into the enterprise GL system. Additionally, not only do the actual account values often need to be valid for many applications, but the combination of account, department, project, identification, etc. that make up an accounting entry should also be valid as well.

In some complex enterprise GL systems, there is a rule based engine that allows for combinations to be verified based on a series of rules, whereby all of the account combinations do not need to maintained explicitly such as in a repository table.

In many businesses the chart of accounts has been maintained manually in the external specialized systems, with a GL clerk performing dual entry for the initial setup of the chart of accounts as well as for the valid set of combinations. In some more advanced implementations of these systems, systems integrators have built customized solutions between the two systems to synchronize the master data in a more effective manner, reducing the burden of manual entry. However synchronizing the valid set of combinations that are derived by a rules based engine has proven to be very complex, and limitations or assumptions usually must be built into the integration for it to function properly.

These solutions are prone to problems with either the data becoming stale in one system, where a clerk updates a chart of account combination in the repository GL system, and has some delay to enter in the second, specialized system. Even more sophisticated systems that have customized solutions often employ constraints on the ability of the integration to use all aspects of the rules based engine. This effectively restricts the complexity of the rule setup allowed by the GL system, therefore removing delivered functionality. For example structures such as "trees" can be used to allow the rules based engine to determine valid account combinations. Yet in some integrations, trees may not be supported.

BRIEF SUMMARY OF THE INVENTION

Embodiments in accordance with the present disclosure relate to a web service that validates both chart of account values, as well as a combination of accounts, and returns to the service caller a response indicating the outcome of the validation. The combination of accounts can include an account value corresponding to a department, a product, and other data. The validation can use hierarchical trees and negative rules to determine whether the specified chart of account values and combination of accounts is valid.

One embodiment relates to a computerized method of validating against a chart of accounts. The method includes receiving into a memory a request to validate chart of account values and a combination of accounts, the combination including an account value corresponding to a department and a product, determining, using a processor operatively coupled to the memory, whether the chart of account values are valid, and establishing whether the combination of the account value, department, and product is valid. The method further includes sending, using the processor, a response based on the determination of whether the chart of account values are valid and based on the establishment of whether the combination is valid.

The method can also include one in which the receiving and sending are to and from a web service, respectively. The method can also include a determination of validity based on a negative rule and/or a hierarchical tree.

Yet other embodiments relate to systems and machine-readable tangible storage media which employ or store instructions for the methods described above.

A further understanding of the nature and the advantages of the embodiments disclosed and suggested herein may be realized by reference to the remaining portions of the specification and the attached drawings.

The figures will now be used to illustrate different embodiments in accordance with the invention. The figures are specific examples of embodiments and should not be interpreted as limiting embodiments, but rather exemplary forms and procedures.

DETAILED DESCRIPTION OF THE INVENTION

The proposed solution provides a web service that efficiently validates both the chart of account values as well as the combination of accounts and returns to the service caller a response indicating the outcome of the validation. The validation can use hierarchical trees and/or negative rules to determine whether the chart of account values and combination of accounts are valid. The combination of accounts can include an account value corresponding to a department and a product. The validation can extend down to the line level of the request, which can be in extensible markup language (XML).

A specialized system will determine the set of account combinations that it wishes to have validated. The information is put into a canonical model representing a commonly understood format for a chart of accounts combination.

In operation of an embodiment, a list of account combinations in a string is provided to the service provider, or General Ledger (GL) system, for validation. Through options set in the message sent to the GL system, the calling system can indicate whether or not it would like to validate each individual option in the string. The calling system can also toggle an option to validate the chart of account values independent of the combination of the chart of accounts string. The providing GL system validates the combination and the individual account values as instructed and then provides back a response that can be understood by the calling system.

The response can include three types of information: (1) a header level error indicating that GL system does not understand the request and cannot process it; (2) a line level indicator providing that the account value or combination is not valid for the combination string sent; or (3) a header level success indicating that all of the lines sent to GL system are valid.

One embodiment requires that the requesting system to first determine the complete set of unique combinations and then segregate or chunk that data into more manageable sizes. The smaller messages containing a portion of the complete list of combinations can be sent in parallel to improve the performance. Also, the sending of only unique combinations reduces the load on the providing system.

The requesting system should then submit the accounting entries to the GL system as quickly as is reasonable to prevent the combinations being modified in the source system and thus invalidating the set of combinations previously submitted. Preferably, the GL system should have the master data repository modified at well known intervals to avoid any difference between the combination validations and accounting entries that are later submitted to the GL system.

Figure 1:
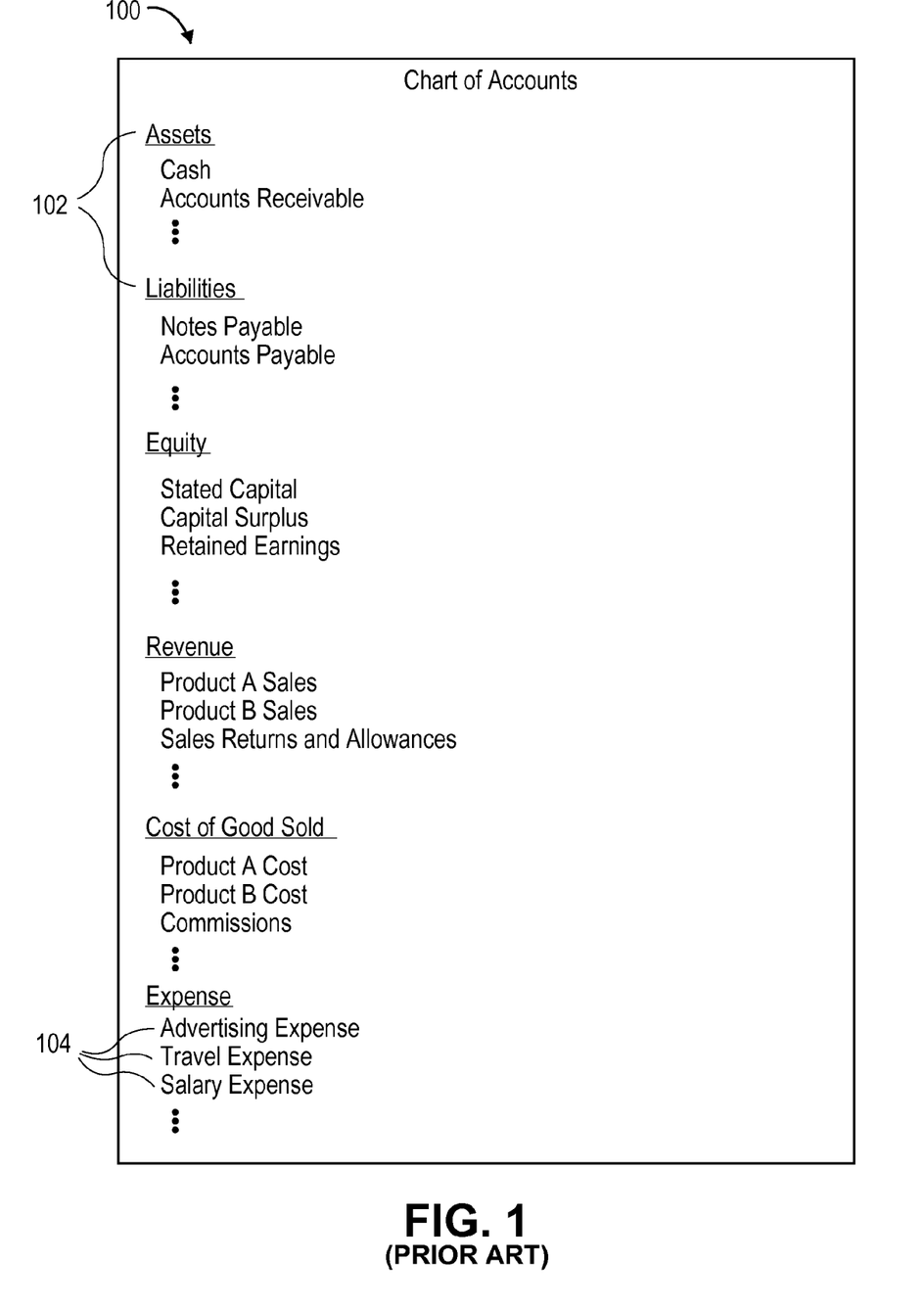
FIG. 1 illustrates a simple chart of accounts of the prior art.

FIG. 1 illustrates a simple chart of accounts 100 as known in the prior art. As is common in Generally Accepted Accounting Principals (GAAP), account types 104 are often organized by major account types 102.

Figure 2:
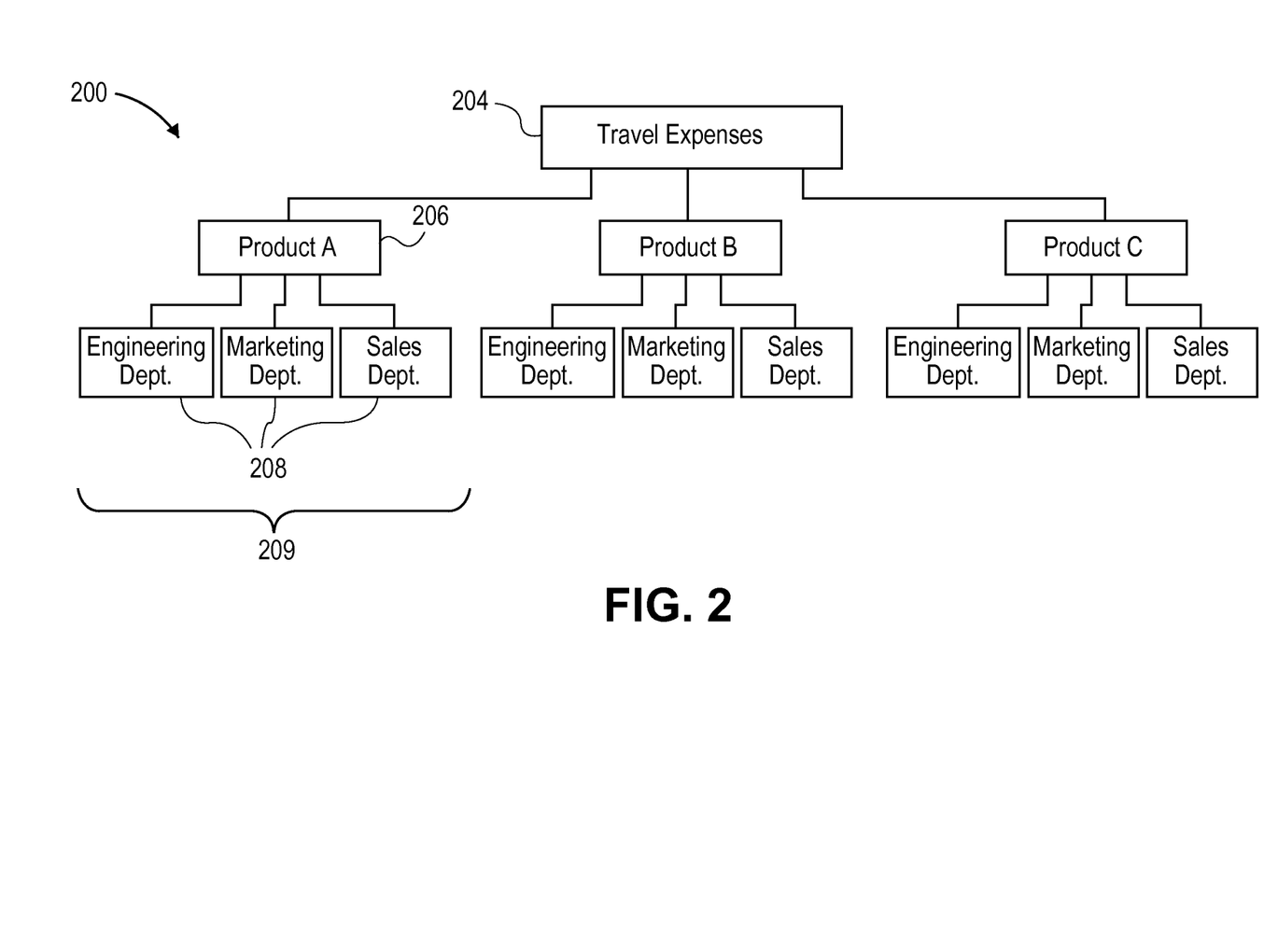
FIG. 2 illustrates a hierarchical tree in accordance with an embodiment.

FIG. 2 illustrates a hierarchical tree 200 for accounts according to an embodiment. A business entity can be organized by product line, and the accounts for travel expenses may also be organized by product line. Product 206 in the product line is further divided into accounts 208 for the Product A Engineering Department, Product A Marketing Department, and Product A Sales Department. Accounts may be organized differently than across product lines, such as by company-wide divisions, departments, profit centers, and business functions. The exemplar combination of accounts 209 in Product A is valid for this organization.

Figure 3:
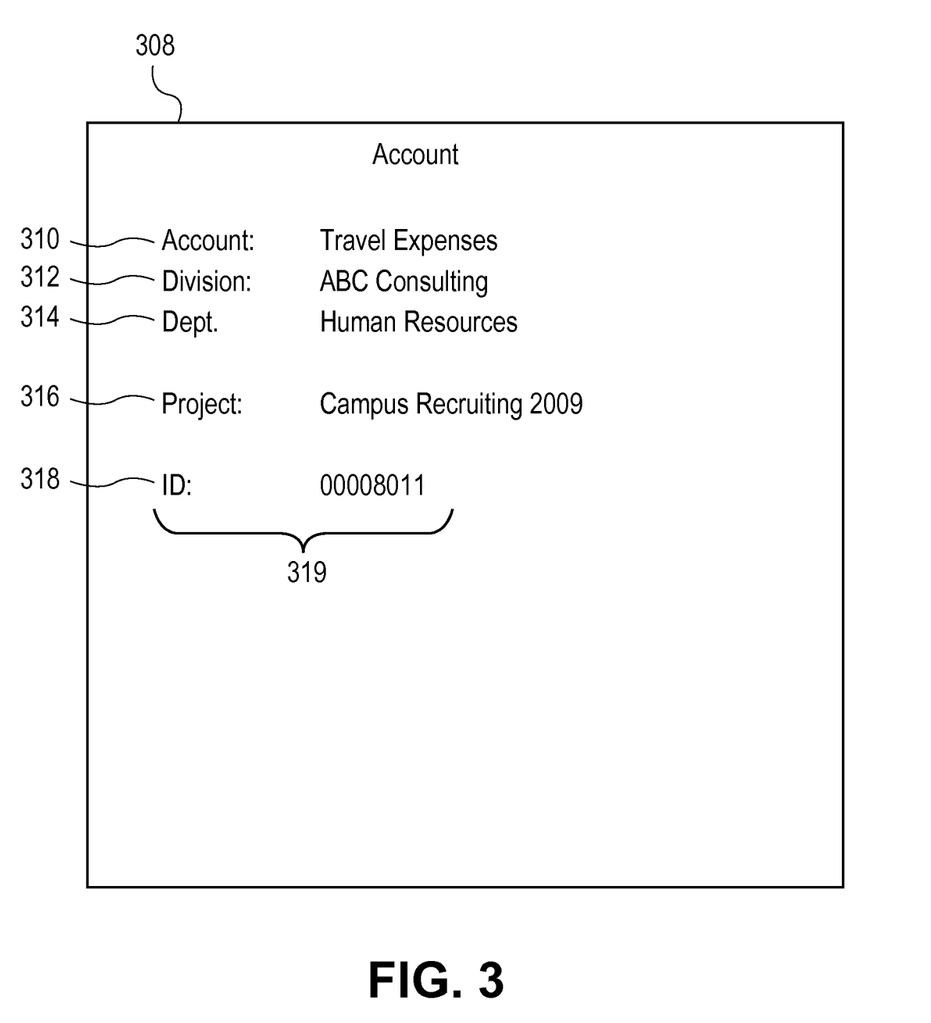
FIG. 3 illustrates an account in accordance with an embodiment.

FIG. 3 illustrates an account in accordance with an embodiment. Account 308 has account values, which are shown as account name 310, division 312, department 314, project 316, and identifier 318. A plurality of select accounts, such as those in FIG. 2, make up a combination of accounts.

Figure 4:
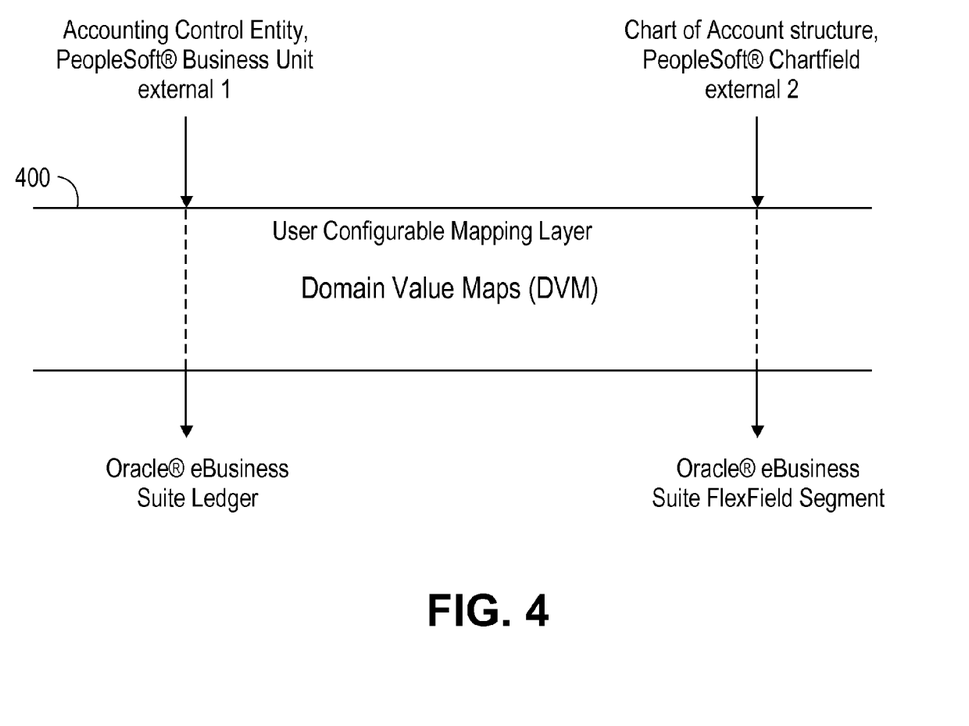
FIG. 4 illustrates a user configurable mapping layer in accordance with an embodiment.

FIG. 4 illustrates a user configurable mapping layer 400 in accordance with an embodiment. The exemplary embodiment leverages a user configurable mapping layer, referred to as Domain Value Maps (DVM) so that external systems can dynamically map their legacy dimensions. Delivered mappings with the service include Accounting Control Entity, PeopleSoft® Business Unit & Ledger, to an Oracle® eBusiness Suite Ledger and the Chart of Account structure, PeopleSoft® Chartfield to eBusiness Suite FlexField Segment. The DVM architecture will also allow multiple participating systems of this integrations to set up and maintain their own separate mappings allowing multiple systems to coexist with each other.

Figure 5:
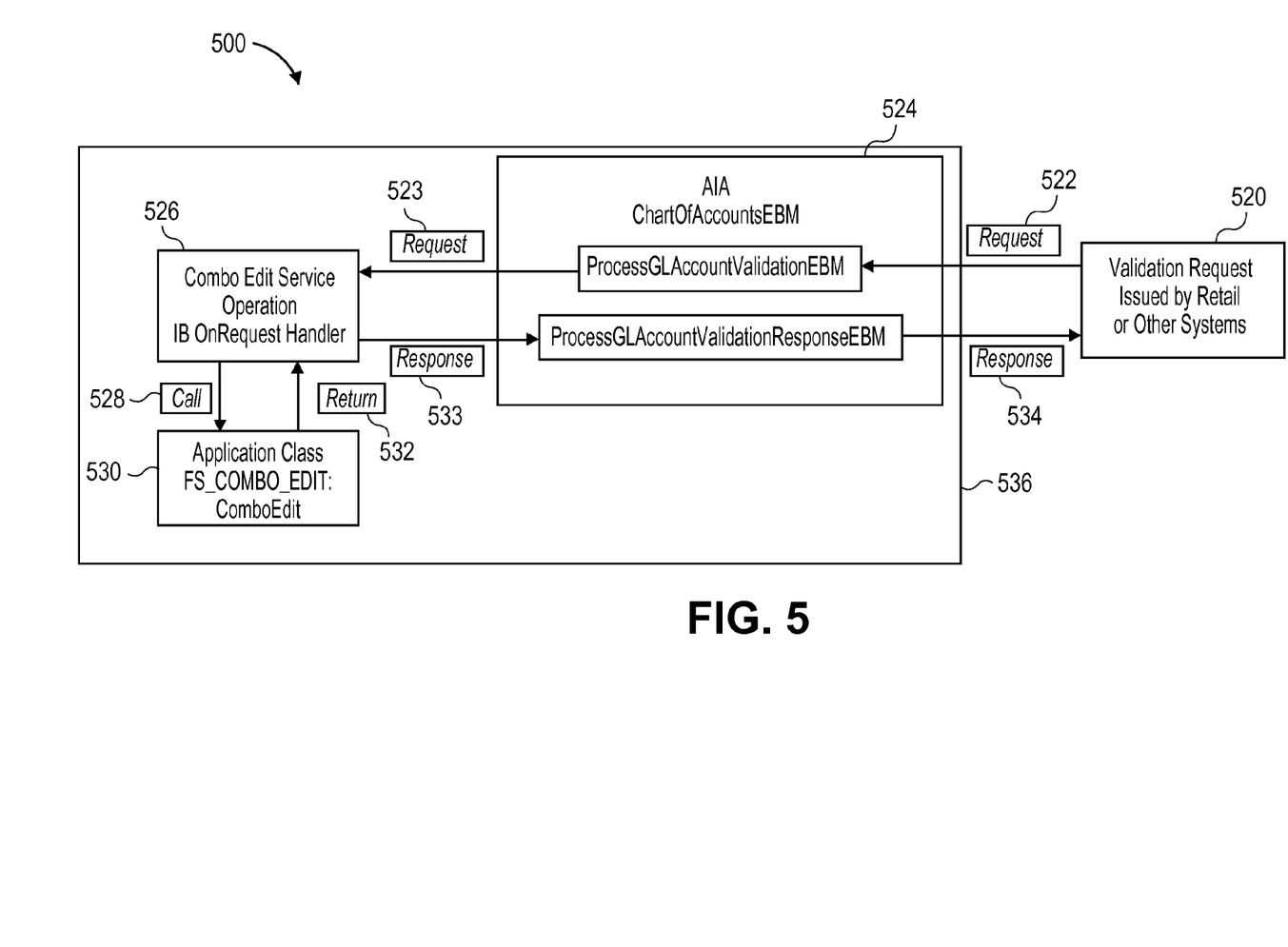
FIG. 5 illustrates an edit service operation in accordance with an embodiment.

FIG. 5 illustrates an edit service operation in accordance with an embodiment. In this example, requester 520 wishes to discover whether a chart of accounts value and combination of accounts is valid. Requester 520 can include a person, computer application, thread, process, or other entity configured to send a request. To discover whether the chart of accounts value and combination of accounts is valid, requester 520 sends request 522 into module 524. Request 524 includes account 308 and optionally other accounts. Request 524 can include ASCII or binary packet or other information, including strings, records, or other formatted information based on the chart of accounts value and combinations of accounts in a synchronous communication. Asynchronous communication is also possible. Module 524 determines whether request 522 is formatted correctly. Module 524 can include an application, process, thread, or other software running in one or more processors, or firmware or hardware configured to accept a request. If the request is not formatted correctly or module 524 cannot otherwise understand request 522, then a header level error is issued as a response. A header level error can include a flag in a header, a data stream indicating an error in a header, or other indicator that there was an error in the request. If the request is formatted correctly, then request 522 is passed on as request 523 to handler 526. Request 523 can be in any format such as those described for request 522 but need not be the same format or structure of request 522. Handler 526 can include any processing device, computer device, including hardware or software such as those indicated below configured to accept a request. Handler 526 sends call 528 to object 530, which verifies whether account 308 and the other accounts are valid. Call 528 can include any formatted data such as that described above for requests 522 and 523 but need not be the same format. Object 530 can be any programming structure, function, or other programming implement configured to receive call 528 with the formatted data and verify validity of a chart of accounts value and/or combination of accounts. For example, object 530 verifies whether an account exists for travel expenses for the Sales Department of Product A. It may be the case that no travel is authorized for the Sales Dept. to travel for Product A so that an account with that combination is invalid. Although not in the exemplary embodiment, an embodiment can verify the amount (i.e. money) of the debit or credit of the expense.

Object 530 sends return 532 to handler 526, which issues response 533. Return 532 and response 533 can be in a format as discussed above for request 522 but do not need to share the same format. Response 533 flows through module 524, which reformats the response into response 534. Reformatting can include simply passing through the message (i.e. no data reformatting) or can include extensive processing. Response 534 can be in a format as discussed above, but does not need to be in the same format as the other messages and function calls in the system. Response 534 is sent back to requester 520.

Validity can be established down to the row or line level of the request. For example, a set of accounts, each with different combinations of departments and products, can be sent with the validity request. The response can indicate that all the combinations are acceptable except for a particular combination on a line of the request. A "line level indicator" can serve as an indicator in the response for whether a specified row or line is invalid. If a line is not in the response, the requesting system knows that the line is valid. Flagging only invalid lines speeds communications and frees bandwidth for other functions.

Module 524, handler 526, and object 530 are part of web service 536 in the exemplary embodiment. The module, handler, and object can all be a part of a web service as shown, or one can be part of a web service while the other parts are outside of the web service. Web service 536 can execute as software instructions on a computer device, as a dedicated hardware unit, or as any other electron, optical, or mechanical device configured as a web service.

Web service 536 can use negative rules. For example, instead of a (positive) rule identifying that a particular combination of product, division, and other account values is valid, a negative rule can indicate that a particular combination of product, division, and other account value is not valid. To use the example above, a negative rule could determine that no one from the Sales Dept. should be traveling for Product A; therefore, a request to debit $3,000 for travel from that department is invalid.

Web service 536 can also use a hierarchical tree. The service can traverse the tree in order to find an account "leaf" at the end of a branch. If the leaf is not found, then the account is invalid.

The exemplary design validates the combination first, then validates the individual value or values if requested, but only for the individual value(s) which are not in an invalid combination. This can speed up processing, because for those requests that failed the combination validation the line is already in error, and there is no need to catch more errors if any.

A request can include name/value pairs. For example in FIG. 3, account 308 shows name/value pair 319 for the name "ID" and the value "00008011." A request can include a string of name/value pairs for which a combination can be validated, for which values can be validated, and for which names can be validated.

Figure 6:
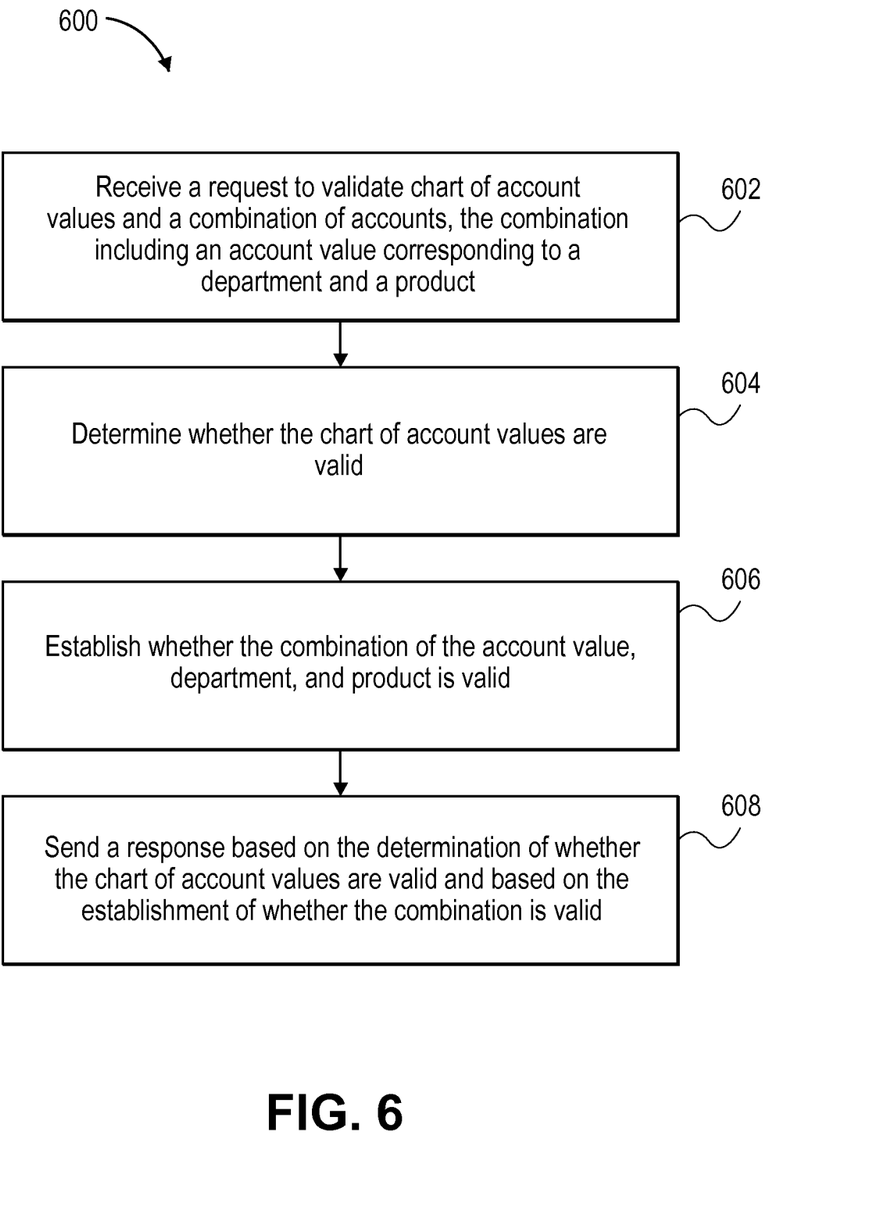
FIG. 6 is a flowchart illustrating an embodiment in accordance with the present invention.

FIG. 6 shows an example flowchart illustrating a process in accordance with one embodiment. This process can be automated in a computer or other machine. The process can be coded in software, firmware, or hard coded as machine-readable instructions and run through a processor that can implement the instructions. In operation 602, a request to validate chart of account values and a combination of accounts is received. The combination includes an account value corresponding to a department and a product. In operation 604, a determination is made whether the chart of account values are valid. In operation 606, it is established whether the combination of the account value, department, and product is valid. In operation 608, a response is sent based on the determination of whether the chart of account values are valid and based on the establishment of whether the combination is valid. These operations may be performed in the sequence given above or in different orders as applicable.

Figure 7:
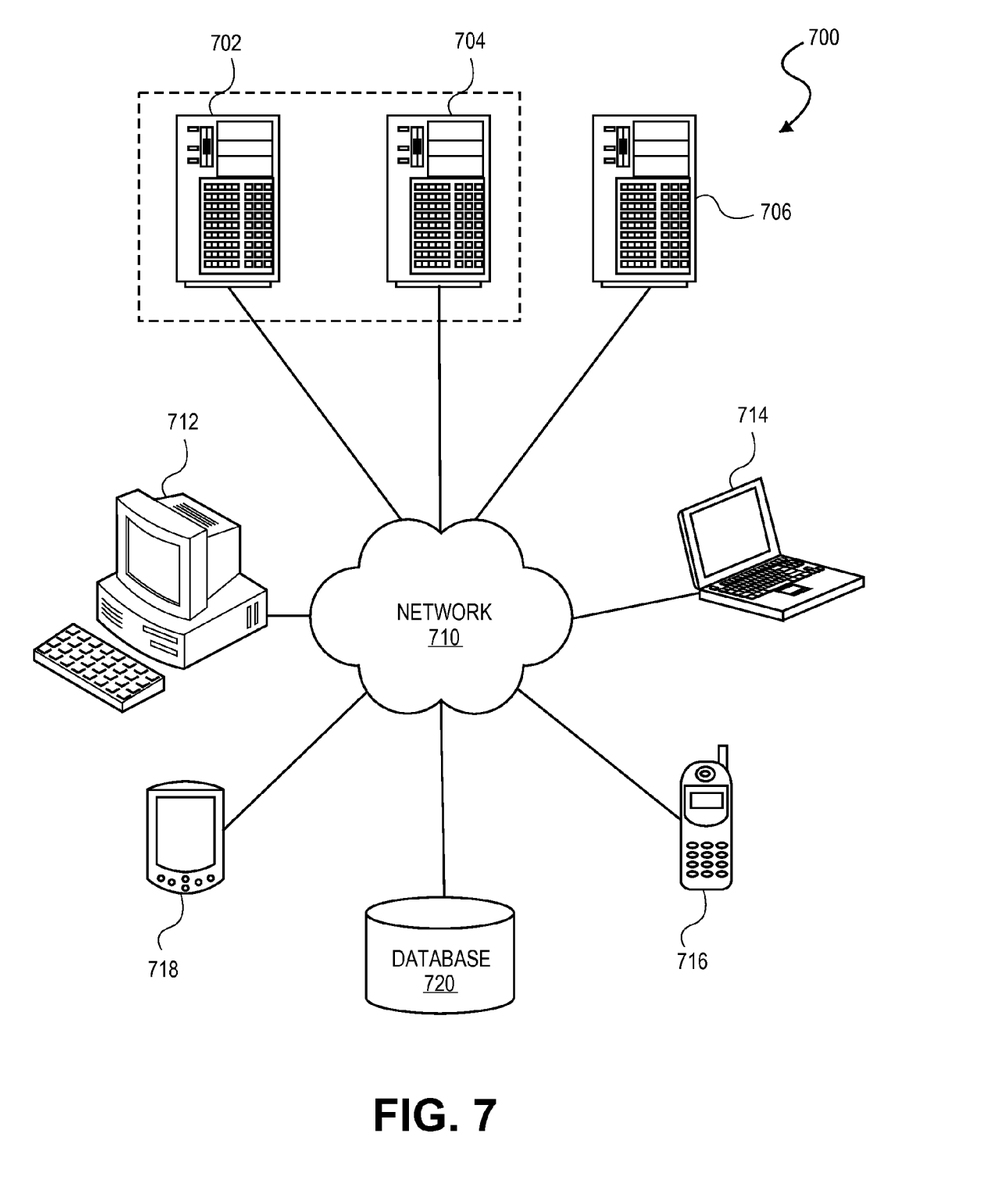
FIG. 7 illustrates components of a computer network that can be used in accordance with one embodiment.

FIG. 7 is a block diagram illustrating components of an exemplary operating environment in which various embodiments of the present invention may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network may can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2 G, 2.5 G, 3 G, 4 G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10 g, that is adapted to store, update, and retrieve data in response to SQL-formatted commands.

Figure 8:
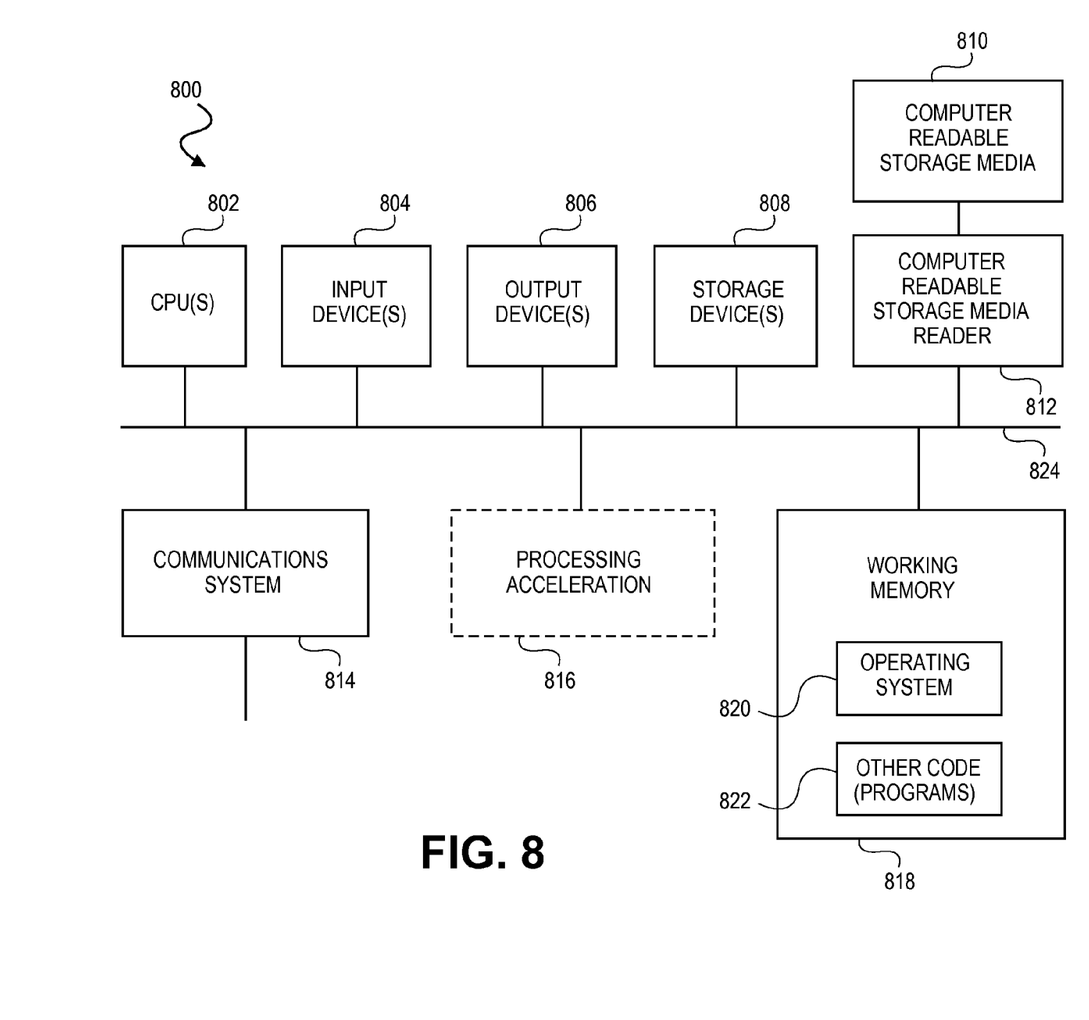
FIG. 8 illustrates components of a computerized device that can be used in accordance with one embodiment.

FIG. 8 illustrates an exemplary computer system 800, in which various embodiments of the present invention may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information.

The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method of validating against a chart of accounts, the method comprising:
 receiving into a memory a request to validate chart of account values and a combination of accounts, the combination including an account value corresponding to a department and a product;
 establishing, using a processor operatively coupled to the memory, whether the combination of the account value, department, and product is valid based on a set of rules;
 determining, using the processor operatively coupled to the memory, whether the chart of account values are valid in response to traversing a hierarchical information defining the chart of accounts according to a positive determination that the combination of the account value, department, and product is valid; and
 sending, using the processor, a response based on the determination of whether the chart of account values are valid and based on the establishment of whether the combination is valid.

2. The method of claim 1 wherein the receiving is to a web service and the sending is from the web service.

3. The method of claim 1 wherein the determining whether the chart of account values are valid includes evaluating a negative rule.

4. The method of claim 1 wherein the response includes a line level indicator indicating that the account value is not valid.

5. The method of claim 1 wherein the response includes a line level indicator indicating that the combination is not valid.

6. The method of claim 1 wherein the response includes a header level indicator indicating that all combinations in the request are valid.

7. The method of claim 1 further comprising performing the computer-implemented method for a second request to validate chart of account values and a combination of accounts, the first and second methods being performed using multi-threading.

8. The method of claim 1 wherein the determining whether the chart of account values are valid includes applying a negative rule to the combination of the account value, department, and product.

9. The method of claim 8 wherein the establishing further includes applying a negative rule against the combination.

10. The method of claim 1 wherein the request conforms to an extensible markup language (XML) schema.

11. The method of claim 1 wherein the request includes name/value pairs.

12. A machine-readable storable medium embodying information indicative of instructions for causing one or more machines to perform operations for validating a chart of accounts, the operations comprising:
   receiving a request to validate chart of account values and a combination of accounts, the combination including an account value corresponding to a department and a product;
   establishing whether the combination of the account value, department, and product is valid based on a set of rules;
   determining whether the chart of account values are valid in response to traversing a hierarchical information defining the chart of accounts according to a positive determination that the combination of the account value, department, and product is valid; and
   sending a response based on the determination of whether the chart of account values are valid and based on the establishment of whether the combination is valid.

13. The medium of claim 12 wherein the operations comprising receiving is into a web service and the sending is from the web service.

14. The medium of claim 12 wherein the operations comprising establishing whether the combination of the chart of account value, department, and product is valid includes evaluating a negative rule.

15. A computer system for validating against a chart of accounts, the computer system comprising:
   at least one processor;
   a memory operatively coupled to the at least one processor, the processor enabled to execute program code including:
   program code for receiving a request to validate chart of account values and a combination of accounts, the combination including an account value corresponding to a department and a product;
   program code for determining whether the combination of the account value, department, and product is valid based on a set of rules;
   program code for determining whether the chart of account values are valid in response to traversing a hierarchical information defining the chart of accounts according to a positive determination that the combination of the account value, department, and product is valid;
   program code for sending a response based on the determination of whether the chart of account values are valid and based on the establishment of whether the combination is valid.

16. The system of claim 15 wherein the computer system is a web service.

17. The system of claim 15 wherein the rules engine includes a negative rule.

* * * * *

UNITED STATES PATENT AND TRADEMARK OFFICE
CERTIFICATE OF CORRECTION

| | | |
|---|---|---|
| PATENT NO. | : 8,645,234 B2 | Page 1 of 1 |
| APPLICATION NO. | : 12/548667 | |
| DATED | : February 4, 2014 | |
| INVENTOR(S) | : Du et al. | |

It is certified that error appears in the above-identified patent and that said Letters Patent is hereby corrected as shown below:

In the Specification

In column 3, line 61, delete "Principals" and insert -- Principles --, therefor.

In column 5, line 32, delete "electron," and insert -- electro-, --, therefor.

In column 6, line 39, delete "may can" and insert -- can --, therefor.

In column 6, line 51, delete "GRPS," and insert -- GPRS, --, therefor.

In column 7, line 55, after "media" insert -- reader 812, a communications system 814 (e.g., a modem, a network card (wireless or wired), an --.

Signed and Sealed this
Fifteenth Day of July, 2014

Michelle K. Lee
*Deputy Director of the United States Patent and Trademark Office*